358-69. OR 3,041,392 SR

T6532

SEARCH ROOM

COLOR TELEVISION RECEIVER INDEXING APPARATUS

Filed March 6, 1959 2 Sheets-Sheet 1

INVENTORS.
FRANCIS P. KEIPER, JR.
JOHN B. CHATTEN
STEPHEN W. MOULTON

BY Fordyce A. Bothwell
ATTORNEY

COLOR TELEVISION RECEIVER INDEXING APPARATUS

Filed March 6, 1959 2 Sheets-Sheet 2

INVENTORS.
FRANCIS P. KEIPER, JR.
JOHN B. CHATTEN
STEPHEN W. MOULTON
BY Fordyce A. Bothwell
ATTORNEY 3,041,392

COLOR TELEVISION RECEIVER INDEXING APPARATUS

Francis P. Keiper, Jr., Oreland, John B. Chatten, Philadelphia, and Stephen W. Moulton, Wyncote, Pa., assignors, by mesne assignments, to Philco Corporation, Philadelphia, Pa., a corporation of Delaware Filed Mar. 6, 1959, Ser. No. 797,684
19 Claims. (Cl. 178—5.4)

This invention relates to color television receivers and more particularly to receivers of the type employing a single index-type cathode ray tube which, in addition to producing the color image, produces an index signal indicative of the instantaneous position of the electron beam, such signal being utilized to effect proper coordination at each instant between modulation and position of said beam, which is essential for proper color rendition. Color television receivers of this type are now well known in the art, and therefore the following brief discussion thereof will suffice for the purpose of this specification.

First, with respect to the cathode ray tube, the screen thereof comprises successive groups of light-emissive elements, the elements of each group being emissive of light of different primary colors in response to electron impingement. The screen further comprises means for producing the desired index signal, e.g. by secondary electron emission or by light emission. Preferably, the colored light-emissive elements are in the form of stripes extending transversely to the direction of line scanning and arranged in triplets, each triplet comprising phosphor stripes emissive of light of three primary colors such as red, green and blue. The means for producing the index signal preferably comprises stripe-like elemental areas in parallel relation to the colored light-producing stripes and positionally related thereto so that the phase of the index signal is indicative of the position of the electron beam in relation to the triplets.

Next with respect to the reproduction of the color image, it should be borne in mind that the now-standard composite color television signal comprises the luminance signal, the chrominance signal which is transmitted as amplitude and phase modulation of a subcarrier in the upper portion of the video band, and the color reference signal consisting of bursts of the unmodulated subcarrier occurring during the blanking intervals immediately following the horizontal synchronizing pulses. In a receiver of the type here involved, the writing frequency, usually about 7 mc., is the nominal rate at which the electron beam traverses the color triplets, i.e. the number of triplets traversed per second. For proper reproduction of the color image, it is necessary to produce a color writing signal at the writing frequency containing the color information of the chrominance signal and it is necessary to effect proper coordination at each instant between modulation and position of said beam according to the indexing information of the index signal.

In a color television receiver of the type briefly discussed above, the index signal may be produced by providing an index stripe for each of the color triplets, in which case the index signal has a frequency corresponding to the rate of beam traversal of the triplets. However, such an arrangement gives rise to a problem in that phase error is introduced into the index signal when the color component of the beam modulation is high, i.e. when the ratio of chrominance to luminance is high, due to highly saturated colors of the image being televised. U.S. Patent No. 2,778,971, issued January 22, 1957, to D. E. Sunstein and assigned to the assignee of the present application, is directed to this problem and proposes a solution of the same.

In accordance with the teaching of the Sunstein patent, provision is made for producing an index signal whose frequency is a harmonic of the rate at which the color triplets are scanned, such signal being utilized to control an oscillator. While such an index signal is phase invarient in the presence of strong beam modulating color signal, it is "ambiguous" in that its phase at a particular instant is not necessarily indicative of beam position for a certain one color but may be indicative of beam position for any one of the several colors. To overcome this objection, the Sunstein patent further teaches an arrangement by which an unambiguous signal, e.g. one having a frequency corresponding to the rate of beam traversal of the color triplets, is produced at the beginning of each line scan, prior to the image-forming portion of the line scan, and said signal is utilized to further control the oscillator so as to effect proper phasing of the color writting signal at the beginning of each line.

One object of the present invention is to provide an improved system of this general type, i.e. one involving the use of both ambiguous and unambiguous signals, in which the ambiguity may be resolved both at the beginning of and during the line scan.

Another object of the invention is to provide an improved system wherein an index signal is produced from an ambiguous signal and the correct phase of the index signal is established by means of an unambiguous signal.

Still another object of the invention is to provide a system wherein color writing will automatically stop if the ambiguous signal should disappear for any reason. In such event misphasing of the index signal would tend to destroy the color image, and it is far better to stop the color writing temporarily rather than to have it continue.

A further object of the invention is to provide a system wherein the index signal is produced from an ambiguous signal through the medium of frequency conversion means which is started in correct phase by an unambiguous signal at the beginning of each line scan.

Other objects of the invention will become apparent as the description proceeds.

In the preferred form of the invention, an ambiguous signal is produced whose frequency bears a fractional relation to the color writing frequency, and a frequency conversion loop is employed to convert the frequency of said signal to the color writing frequency. The conversion loop is started in correct phase by an unambiguous signal at the beginning of each line scan.

Further, in the preferred form of the invention, the unambiguous signal continues to be produced throughout the image-forming portion of the line scan and is supplied to the frequency conversion loop at all times when the color modulation of the beam is not sufficiently high to cause objectionable misphasing of the unambiguous signal. It has been found that this condition exists during a substantial part of the time, and advantage is taken of this fact to ensure correct phasing in the frequency conversion loop throughout the entire line scan.

The invention may be fully understood from the following detailed description with reference to the accompanying drawings wherein FIG. 1 is a block diagram of a color television receiver including one embodiment of this invention;

Figure 1:
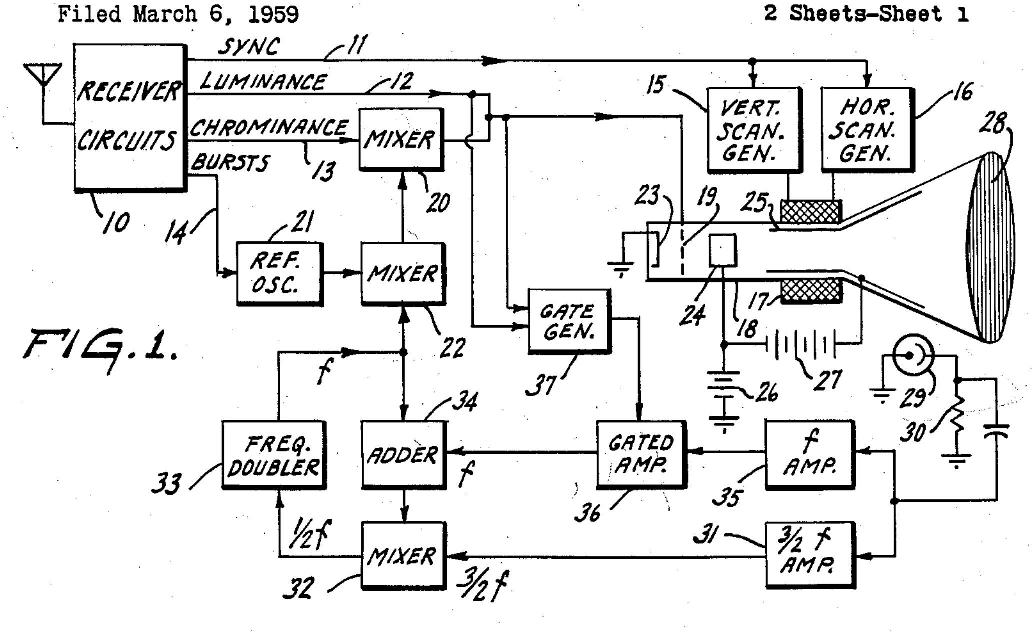

Referring first to FIG. 1, block 10 represents the conventional receiver circuits by which the components of an incoming color television signal are derived. These components comprise the deflection synchronizing components derived at output connection 11, the luminance component derived at output connection 12, the chrominance component derived at output connection 13, and the bursts derived at output connection 14. The deflection synchronizing components are supplied to the vertical and horizontal scanning circuits represented at 15 and 16 which supply deflection currents to the yoke 17 associated with the cathode ray tube 18. The luminance component is supplied to the control grid 19 of the cathode ray tube. The chrominance component, which comprises the aforementioned modulated subcarrier, is supplied to a heterodyne mixer 20 for derivation of the color writing signal which in turn is supplied to the control grid 19 of the cathode ray tube 18. The bursts, each of which comprises a number of cycles of the unmodulated subcarrier occurring during each blanking interval, are supplied to a reference oscillator 21 which supplies to a heterodyne mixer 22 a continuous color reference signal having the frequency of the subcarrier.

As hereinbefore stated, the nominal frequency of the color writing signal may be 7 mc. The frequency of the subcarrier may be 3.58 mc. Now in the system illustrated, it is desired to supply to mixer 22 an unambiguous index signal, i.e, a signal having the nominal writing frequency and whose phase at a particular instant is indicative of beam position with respect to color stripes, and it is further desired that the index signal shall not be misphased by high color signal modulation of the electron beam within the cathode ray tube 18. The manner in which the index signal is derived in accordance with this invention will be described presently. Thus the mixer 22 receives the color reference signal having a frequency of 3.58 mc. and the derived index signal having a nominal frequency of 7 mc., and by additive heterodyne action the mixer 22 produces a resultant signal having a frequency of 10.58 mc. and phased according to the indexing information of the index signal. This resultant signal is supplied to mixer 20 which also receives the 3.58 mc. chroma signal. By subtractive heterodyne action the mixer 20 produces the 7 mc. writing signal which contains the color information of the chroma signal and is phased according to the indexing information of the index signal.

Referring now more particularly to the cathode ray tube 18, in addition to the grid 19 it comprises the usual cathode 23 and at least one anode. In the form shown, it comprises a focusing anode 24, and an accelerating anode 25 which may consist of a conductive coating on the inner wall of the tube. Suitable operating voltages may be supplied from the receiver's power supply, the batteries 26 and 27 being conveniently representative of the voltage sources.

The faceplate 28 may serve as a supporting base for the screen elements, as hereinafter described, it being understood that the cathode ray tube is of the index type. Preferably, the cathode ray tube is of the photo-index type, i.e. it produces index signal by light emission from index elements of the screen. The index elements may be formed of fluorescent material such as zinc oxide which emits non-visible light in response to electron impingement. The photocell 29 receives the light pulses and produces the index signal across resistor 30. Such production of the index signal is well known, as shown for example in U.S. Patent No. 2,749,449 issued June 5, 1956, to W. E. Bradley et al. Of course, it will be understood that the index signal may be produced in any other suitable manner, e.g. by secondary electron emission as shown in the above-mentioned Sunstein patent.

As hereinbefore set forth, an unambiguous index signal derived from the screen structure of the cathode ray tube, while normally providing the proper phase reference indicative of beam position with respect to color stripes, is subject to misphasing whenever the color component of the beam modulation is high; and the present invention overcomes this objection by deriving an index signal from an ambiguous signal and by utilizing an unambiguous signal to effect correct phasing of the index signal. In describing the index signal-deriving system provided by this invention, it will be convenient to designate the nominal color writing frequency by the letter $f$.

In the embodiment shown in FIG. 1, an ambiguous signal which may have a frequency of $3/2\ f$, is supplied by the cathode ray tube as hereinafter described and is selected by a tuned amplifier 31. This signal is supplied to a count-down loop comprising a heterodyne mixer 32, a frequency doubler 33 and an adder 34. By subtractive heterodyne action of mixer 32, the $3/2\ f$ signal from amplifier 31 is converted to a $1/2\ f$ signal which is converted by doubler 33 to a signal of frequency $f$. Further, in accordance with this invention, unambiguous signal of frequency $f$ is derived as hereinafter described and is utilized to effect correct phasing in the count-down loop. This signal is selected by tuned amplifier 35 and is supplied through a gated amplifier 36 to the adder 34 at all times when the color component of the beam modulation is not sufficiently high to cause misphasing of the signal. In the embodiment of FIG. 1, the gated amplifier 36 is controlled by a gate generator 37 which supplies a gating signal to cut off amplifier 36 whenever the chrominance signal is of sufficiently high amplitude in relation to the luminance signal to cause misphasing of the signal $f$.

In operation of the system shown in FIG. 1, the gated amplifier 36 is conductive except when it is rendered nonconductive by the gate generator 37. During the image-forming portion of each line scan, the $3/2\ f$ signal is supplied continuously to the count-down loop which converts it into a signal of frequency $f$. At the beginning of each line scan, the signal $f$ is supplied to adder 34 and serves to start the count-down loop in the correct phase. Thus the index signal derived from the $3/2\ f$ signal and supplied to the mixer 22 is caused to be of proper phase in relation to the beam position. During the image-forming portion of each line scan, whenever the color component of the beam modulation is not sufficiently high to cause misphasing of the signal $f$, the latter is supplied to the adder 34 and corrects the phasing of the derived index signal if and when necessary. Whenever the color component of the beam modulation is sufficiently high to cause misphasing of the signal $f$, the latter is gated off temporarily but the count-down loop continues to derive the index signal.

Figure 2:
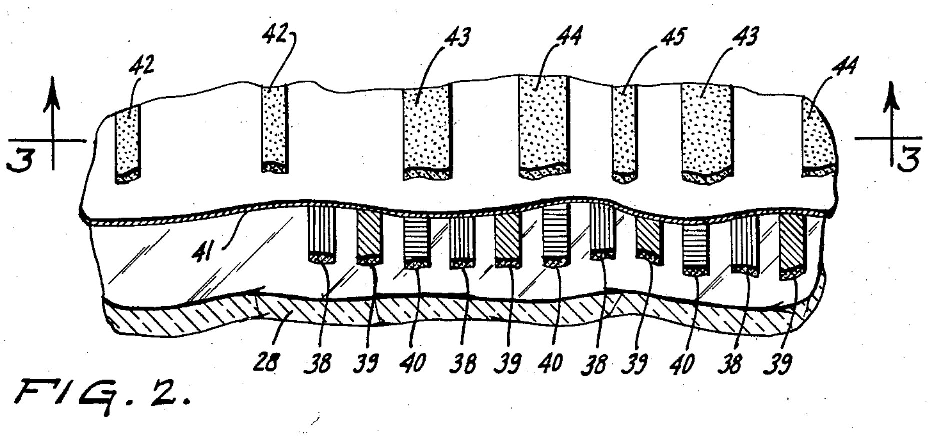
FIG. 2 is a fragmentary perspective view of one form of screen structure which may be employed according to this invention.
Figure 3:
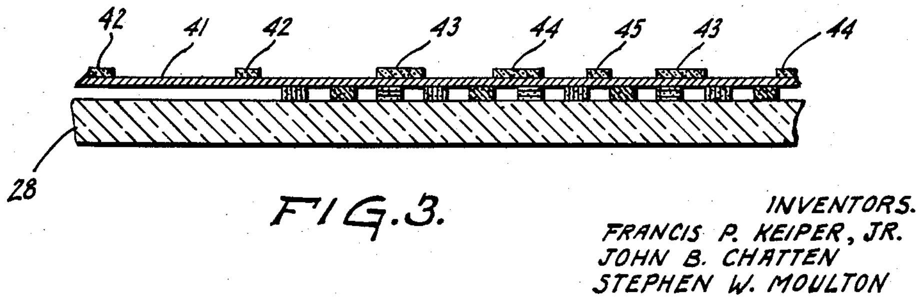
FIG. 3 is a cross-sectional view of the same structure taken along line 3—3 in FIG. 2.

Referring now to FIGS. 2 and 3, there is shown a portion of one form of screen structure for producing the unambiguous and ambiguous signals $f$ and $3/2\ f$ in the system of FIG. 1. In this screen structure, as in certain prior screen structures for photo-index type cathode ray tubes, the colored light-emissive phosphor stripes and the light-emissive index stripes are separated by an electron-pervious light-reflecting film or layer which may be composed of aluminum. It will be understood that in FIGS. 2 and 3 the stripes are greatly exaggerated as to width and thickness. In actual practice they are quite fine, being in the nature of lines.

In the illustrated structure the color light-emissive phosphor stripes are placed on the image-forming area of the rear surface of the faceplate 28. These stripes comprise red light-emissive stripes 38, green light-emissive stripes 39, and blue light-emissive stripes 40. Thus there are successive color triplets each of whose stripes successively emit light in the respective primary colors. A thin aluminum film 41 is placed over said stripes, and the index stripes are placed on the aluminum film.

Referring particularly to the index structure, it will be noted that there are index stripes 42 (only two shown) on the left-hand marginal area of the screen ahead of the image-forming area as regards impingement by the electron beam, and there are also index stripes 43 and 44 having portions overlying the blue light-emissive phosphor stripes 40. Stripes 42 and the said portions of stripes 43 and 44 have a spacing such that they produce, in response to electron beam impingement, the unambiguous index signal having a frequency or periodicity $f$ corresponding to the rate of beam scanning of the color triplets.

It will be noted also that stripes 43 and 44 have portions overlying spaces between the color stripes and there are also stripes 45 (only one shown) overlying spaces between the color stripes. The latter portions of stripes 43 and 44 and the stripes 45 have a spacing such that they produce, in response to electron beam impingement, the ambiguous signal having a frequency or periodicity $3/2\ f$. This is because they overlie alternate ones of the spaces between the color stripes.

Thus, as the electron beam scans across the screen structure, two signals are produced by the index stripes having distinct frequencies or periodicities, and because of this distinguishing characteristic the signals may be selected respectvely by the tuned amplifiers 31 and 35 in FIG. 1.

The gated amplifier 36 may comprise a vacuum tube having at least triode elements, whose grid is driven to cut-off whenever a negative gating signal is supplied by gate generator 37.

Figure 4:
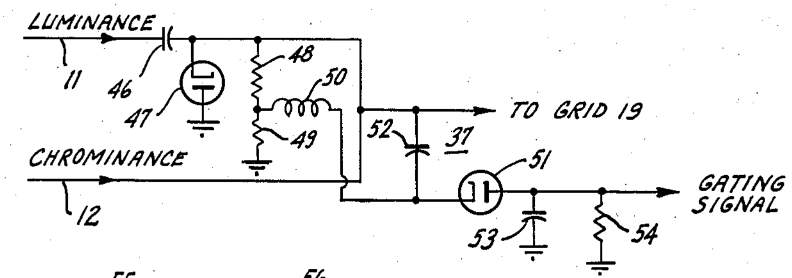
FIG. 4 is a diagrammatic illustration of a gate generator which may be employed in the receiver of FIG. 1.

FIG. 4 shows one form of the gate generator for use in the system of FIG. 1. The luminance signal is supplied through capacitor 46 and diode 47 effects D.C. restoration as will be well understood. A voltage divider comprising resistors 48 and 49 is connected across the luminance channel and a fractional portion, e.g. one eighth, of the luminance signal is derived by the voltage divider and is supplied through an inductor 50 to the cathode of diode 51. The chrominance signal is supplied through capacitor 52 to the cathode of diode 51. Inductor 50 has an inductance value such that it has low impedance for the relatively lower frequency luminance signal and high impedance for the relatively higher frequency chrominance signal supplied through capacitor 52. The latter capacitor has a capacitance value such that it has low impedance for the relatively higher frequency chrominance signal and high impedance for the relatively lower frequency luminance signal. The gating signal, whenever generated, appears across shunt-connected capacitor 53 and resistor 54 which have a time constant such as to produce a continuous signal.

In operation the gate generator effectively determines whether the ratio of chrominance signal amplitude to luminance signal amplitude is at least equal to a predetermined fraction, e.g. ⅛, established by the voltage divider 48, 49. As long as the chrominance signal amplitude is less than one-eighth of the luminance signal amplitude, diode 51 is non-conductive. But whenever the chrominance signal is equal to or greater than such predetermined level, diode 51 conducts and a negative gating signal is supplied to amplifier 36 to cut it off.

Figure 5:
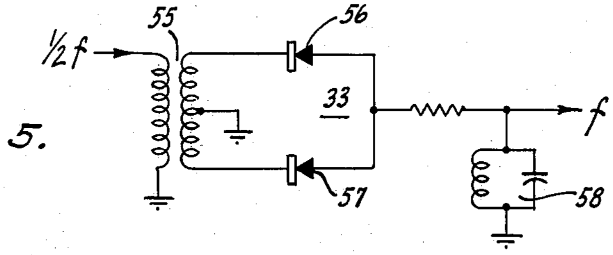
FIG. 5 is a diagrammatic illustration of a frequency doubler which may be employed in the receiver of FIG. 1.

The frequency doubler in FIG. 1 may be of the simple form shown in FIG. 5, comprising a transformer 55, a pair of rectifier elements such as diodes 56 and 57, and a tuned circuit 58 tuned to the frequency $f$, connected as shown. The signal $\frac{1}{2}\ f$ is supplied to the primary of transformer 55, and the signal $f$ is derived across the tuned circuit 58.

From the foregoing description, it will be seen that the system shown in FIG. 1 is novelly characterized in that the desired index signal is derived from an ambiguous signal through operation of a frequency conversion loop which is started in correct phase by an unambiguous signal. Thus apparatus provided in accordance with this invention comprises means for producing in response to electron beam scanning of the cathode ray tube screen a first control signal, e.g. signal $f$, which has a frequency so related to the nominal rate of scanning of the color triplets that it is unambiguously indicative of the instantaneous position of said beam in relation to the elements of each triplet but which tends to be misphased whenever the chrominance modulation of said beam is high, means for producing in response to scanning of said screen a second control signal, e.g. signal $3/2\ f$, having a frequency different from that of said first control signal and not subject to misphasing by high beam modulation but lacking in unambiguous phasal indication of the instantaneous position of said beam in relation to the elements of each of said triplets, means for utilizing said second control signal to produce a third control signal having a frequency corresponding to the rate of scanning of said triplets, and means for utilizing said first control signal at the beginning of each line scan to phase said third control signal in correspondence to beam position, said third control signal being the desired index signal. Further, in the preferred embodiment the second control signal, i.e. the ambiguous signal is effectively converted into the third control signal by means of a frequency conversion loop to which the first control signal is supplied. Further still, in the preferred embodiment above described the first control signal is always present except that it is gated off whenever its phase would be adversely affected by high chrominance modulation of the beam.

An important advantage of the system provided by this invention is that if the $3/2\ f$ signal should disappear for any reasons, such as screen blemishes, noise pulses, etc., there would be no color writing signal supplied to the cathode ray tube. At such time, therefore, the unambiguous signal $f$ supplied through gated amplifier 36 to the adder 34 would necessarily be of proper phase, and upon reappearance of the $3/2\ f$ signal, the count-down loop would be restarted in correct phase by the signal $f$. This automatic stoppage of color writing is advantageous as hereinbefore stated.

Figure 6:
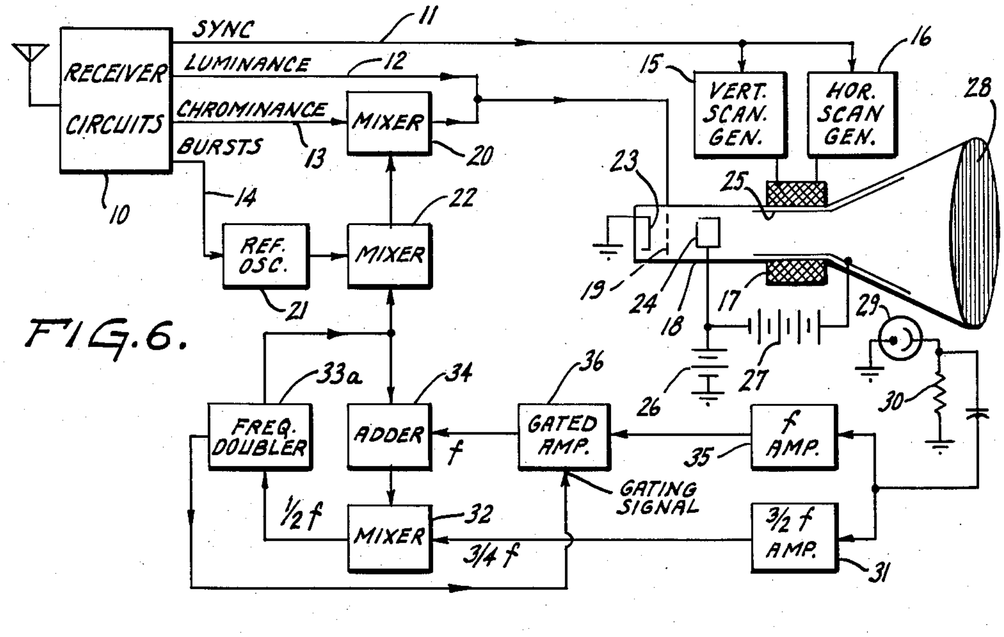
FIG. 6 is a block diagram of a color television receiver including another embodiment of the invention.
Figure 7:
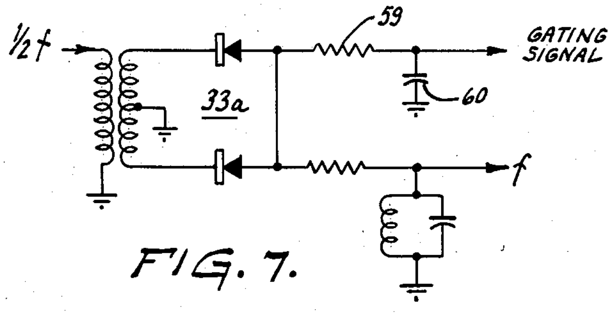
FIG. 7 is a diagrammatic illustration of a frequency doubler which may be employed in the receiver of FIG. 6.

Referring now to FIG. 6, there is shown a color television receiver which is similar to that of FIG. 1 but differs therefrom in that the gate generator 37 is omitted and the gated amplifier 36 is controlled from the frequency doubler 33*a* which may take the form shown in FIG. 7. This frequency doubler is similar to that of FIG. 5 but further includes means for deriving a gating signal. The latter signal is derived from integrating means comprising resistor 59 and capacitor 60.

The system of FIG. 6 lacks the feature whereby the signal $f$ is continuously present except when cut off in the presence of high amplitude chrominance signal. However, it does include the features whereby the signal $f$ starts the count-down loop in correct phase at the beginning of each line scan, and color writing is automatically stopped if the $3/2\ f$ signal disappears.

In operation of this system, at the beginning of each line scan the signal $f$ is supplied to adder 34 and serves to start the count-down loop in the correct phase. Then during the image-forming portion of the line scan amplifier 36 is cut off by the gating signal. In the event that the $3/2\ f$ signal disappears for any reason, color writing automatically stops. And when the $3/2\ f$ signal reappears, the count-down loop is again started in correct phase by the signal $f$.

While certain embodiments of the invention have been illustrated and described, it will be apparent to those skilled in the art that many modifications of the system are possible, some of which are as follows.

With respect to the screen of the cathode ray tube, it will be apparent that this may take various forms, it being well known in the art that various constructions of striped screens are possible.

With respect to the frequency of the ambiguous signal, it will be apparent that other values may be employed. In fact any value may be employed which can be converted to the color writing frequency. For example, the ambiguous signal might have a frequency of $\frac{3}{4}f$ which, when mixed with a signal of frequency $f$, would produce a signal of frequency $\frac{1}{4}f$, which would be multiplied by four to convert it to frequency $f$.

In addition to modifications within the index signal generating system, it will be apparent that modifications are possible in respect to the utilization of the derived index signal. In a broad sense, the purpose of the index signal is to effect proper time coordination between chrominance modulation and position of the electron beam. In the illustrated embodiment, the mixers 20 and 22 are employed to produce a color writing signal which has the writing frequency and is phased according to the phase information of the index signal. However, any suitable arrangement may be employed for utilization of the index signal to accomplish the desired time coordination between chrominance modulation and position of the electron beam.

For example, the index signal derived according to this invention may be utilized in a system wherein the color writing signal is produced by time multiplexing component color signals as in the system disclosed in the aforementioned Sunstein patent. In such case the index signal would be supplied to a phase shifting means to produce a plurality of phase-displaced signals required for the time-multiplexing operation.

The foregoing are only a few of the numerous possible modifications. It will be understood, therefore, that the invention is not limited to the embodiments shown but contemplates all such modifications and embodiments as may occur to those skilled in the art.

We claim:

1. In a color television receiver wherein a color image is produced by translation of video signal components including a chrominance component successively and repetitively representative of primary colors of the image, a color image-producing cathode ray tube having an image screen to be scanned line-by-line by an electron beam within the tube, means for effecting the scanning motion of the electron beam, said screen comprising successive groups of colored light-emissive elements which are successively impinged by the electron beam during each line scan, the elements of each group successively emitting light of said primary colors, means for varying the intensity of said beam in accordance with said video components, means for producing in response to the scanning of said screen a first control signal having a frequency so related to the rate of scanning of said groups as to be unambiguously indicative of the instantaneous position of said beam in relation to the elements of each of said groups, said control signal tending to be misphased whenever the chrominance modulation of said beam is high, means for producing in response to the scanning of said screen a second control signal having a frequency different from that of said first control signal and not subject to misphasing by high beam modulation but lacking in unambiguous phasal indication of the instantaneous position of said beam in relation to the elements of each said groups, means for utilizing said second control signal to produce a third control signal having a frequency corresponding to the rate of scanning of said groups, means for utilizing said first control signal at the beginning of each line scan to phase said third control signal in correspondence to beam position, and means for utilizing said third control signal to effect proper time coordination between chrominance modulation and position of said beam.

2. A color television receiver according to claim 1, wherein said light-emissive elements are in the form of stripes arranged transversely to the direction of line scanning, and each of the means for producing a control signal comprises stripes in parallel relation to the first-mentioned stripes.

3. A color television receiver according to claim 1, wherein said third control signal is produced by frequency conversion of said second control signal.

4. In a color television receiver, a color image-producing cathode ray tube having an image screen to be scanned line-by-line by an electron beam within the tube, means for effecting the scanning motion of the electron beam, said screen comprising successive groups of colored light-emissive elements which are successively impinged by the electron beam during each line scan, the elements of each group successively emitting light of different primary colors, means for varying the intensity of said beam in accordance with video components of a color television signal including a chrominance component successively and repetitively representative of said primary colors, means for producing in response to the scanning of said screen a first control signal having a frequency so related to the rate of scanning of said groups as to be unambiguously indicative of the instantaneous position of said beam in relation to the elements of each of said groups, said control signal tending to be misphased whenever the chrominance modulation of said beam is high, means for producing in response to the scanning of said screen a second control signal having a frequency different from that of said first control signal and not subject to misphasing by high beam modulation but lacking in unambiguous phasal indication of the instantaneous position of said beam in relation to the elements of each of said groups, means for converting said second control signal to a third control signal having a frequency corresponding to the rate of scanning of said groups, means for normally supplying said first control signal to said converting means throughout each line scan to phase said third control signal in correspondence to beam position, means for interrupting the supply of said first control signal to said converting means whenever in the course of a line scan the phase of said first control signal may be adversely affected by high beam modulation, and means for utilizing said third control signal to effect proper time coordination between chrominance modulation and position of said beam.

5. In a color television receiver, a color image-producing cathode ray tube having an image screen to be scanned line-by-line by an electron beam within the tube, means for effecting the scanning motion of the electron beam, said screen comprising successive groups of colored light-emissive elements which are successively impinged by the electron beam during each line scan, the elements of each group successively emitting light of different primary colors, means for varying the intensity of said beam in accordance with video components of a color television signal including a chrominance component successively and repetitively representative of said primary colors, means for producing in response to the scanning of said screen a first control signal having a frequency so related to the rate of scanning of said groups as to be unambiguously indicative of the instantaneous position of said beam in relation to the elements of each of said groups, said control signal tending to be misphased whenever the chrominance modulation of said beam is high, means for producing in response to the scanning of said screen a second control signal having a frequency different from that of said first control signal and not subject to misphasing by high beam modulation but lacking in unambiguous phasal indication of the instantaneous position of said beam in relation to the elements of each of said groups, means for converting said second control signal to a third control signal having a frequency corresponding to the rate of scanning of said groups, a normally-conductive gated amplifier, means for normally supplying said first control signal through said amplifier to said converting means throughout each line scan to phase said third control signal in correspondence to beam position, means for rendering said amplifier non-conductive whenever in the course of a line scan the phase of said first control signal may be adversely affected by high beam modulation, and means for utilizing said third control signal to effect proper time coordination between chrominance modulation and position of said beam.

6. A color television receiver according to claim 5, wherein the frequency of said second control signal bears a fractional relation to the rate of scanning of said groups, and wherein the means for converting said second control signal to a third control signal comprises a frequency conversion loop.

7. A color television receiver according to claim 5, wherein the means for rendering said amplifier non-conductive comprises a gate generator responsive to high amplitude of said chrominance component.

8. In a color television receiver adapted to receive a color television signal from which are derived a luminance video signal, a chrominance video signal and a color reference signal having the same frequency as the chrominance video signal, a color image-producing cathode ray tube having an image screen to be scanned line-by-line by an electron beam within the tube, means for effecting the scanning motion of the electron beam, said screen comprising successive groups of colored light-emissive elements which are successively impinged by the electron beam during each line scan, the elements of each group successively emitting light of different primary colors, means for supplying said luminance signal to said tube to modulate said beam, a first heterodyne mixer to which said chrominance signal is supplied, means for supplying the output of said mixer to said tube also to modulate said beam, a second heterodyne mixer having its output connected to said first mixer, means for supplying said color reference signal to said second mixer, means for producing in response to the scanning of said screen a first control signal having a frequency so related to the rate of scanning of said groups as to be unambiguously indicative of the instantaneous position of said beam in relation to the elements of each of said groups, said produced signal tending to be misphased whenever the chrominance modulation of said beam is high, means for producing in response to the scanning of said screen a second control signal having a frequency different from that of said first signal and not subject to misphasing by high beam modulation but lacking in unambiguous phasal indication of the instantaneous position of said beam in relation to the elements of each of said groups, means for deriving from said second control signal a third control signal having a frequency corresponding to the rate of scanning of said groups, means for utilizing said first control signal to phase said third signal in correspondence to beam position, and means for supplying said third control signal to said second mixer.

9. A color television receiver according to claim 8 wherein said light-emissive elements are in the form of stripes arranged transversely to the direction of line scanning, and each of the means for producing a control signal comprises stripes in parallel relation to the first-mentioned stripes.

10. In a color television receiver adapted to receive a color television signal from which are derived a luminance video signal, a chrominance video signal and a color reference signal having the same frequency as the chrominance video signal, a color image-producing cathode ray tube having an image screen to be scanned line-by-line by an electron beam within the tube, means for effecting the scanning motion of the electron beam, said screen comprising successive groups of colored light-emissive elements which are successively impinged by the electron beam during each line scan, the elements of each group successively emitting light of different primary colors, means for supplying said luminance signal to said tube to modulate said beam, a first heterodyne mixer to which said chrominance signal is supplied, means for supplying the output of said mixer to said tube also to modulate said beam, a second heterodyne mixer having its output connected to said first mixer, means for supplying said color reference signal to said second mixer, means for producing in response to the scanning of said screen a first control signal having a frequency so related to the rate of scanning of said groups as to be unambiguously indicative of the instantaneous position of said beam in relation to the elements of each of said groups, said produced signal tending to be misphased whenever the chrominance modulation of said beam is high, means for producing in response to the scanning of said screen a second control signal having a frequency different from that of said first signal and not subject to misphasing by high beam modulation but lacking in unambiguous phasal indication of the instantaneous position of said beam in relation to the elements of each of said groups, means for converting said second control signal to a third control signal having a frequency corresponding to the rate of scanning of said groups, means for normally supplying said first control signal to said converting means throughout each line scan to phase said third control signal in correspondence to beam position, means for interrupting the supply of said first control signal to said converting means whenever in the course of a line scan the phase of said first control signal may be adversely affected by high beam modulation, and means for supplying said third control signal to said second mixer.

11. In a color television receiver adapted to receive a color television signal from which are derived a luminance video signal, a chrominance video signal and a color reference signal having the same frequency as the chrominance video signal, a color image-producing cathode ray tube having an image screen to be scanned line-by-line by an electron beam within the tube, means for effecting the scanning motion of the electron beam, said screen comprising successive groups of colored light-emissive elements which are successively impinged by the electron beam during each line scan, the elements of each group successively emitting light of different primary colors, means for supplying said luminance signal to said tube to modulate said beam, a first heterodyne mixer to which said chrominance signal is supplied, means for supplying the output of said mixer to said tube also to modulate said beam, a second heterodyne mixer having its output connected to said first mixer, means for supplying said color reference signal to said second mixer, means for producing in response to the scanning of said screen a first control signal having a freequency so related to the rate of scanning of said groups as to be unambiguously indicative of the instantaneous position of said beam in relation to the elements of each of said groups, said produced signal tending to be misphased whenever the chrominance modulation of said beam is high, means for producing in response to the scanning of said screen a second control signal having a frequency different from that of said first signal and not subject to misphasing by high beam modulation but lacking in unambiguous phasal indication of the instantaneous position of said beam in relation to the elements of each of said groups, means for converting said second control signal to a third control signal having a frequency corresponding to the rate of scanning of said groups, a normally-conductive gated amplifier, means for normally supplying said first control signal through said amplifier to said converting means throughout each line scan to phase said third control signal in correspondence to beam position, means for rendering said amplifier non-conductive whenever in the course of a line scan the phase of said first control signal may be adversely affected by high beam modulation, and means for supplying said third control signal to said second mixer.

12. A color television receiver according to claim 11, wherein the frequency of said second control signal bears a fractional relation to the rate of scanning of said groups, and wherein the means for converting said second control signal to a third control signal comprises a frequency conversion loop.

13. In a color television receiver including a color image-producing cathode ray tube having successive groups of screen elements which are successively impinged by an electron beam during each line scan and which emit light of different primary colors, and wherein a color writing signal is supplied to said tube phased according to indexing information of an index signal, apparatus for producing the index signal comprising means for producing in response to scanning within said tube a first control signal having a frequency so related to the rate of scanning of said groups as to be unambiguously indicative of the instantaneous position of said beam in relation to the elements of each of said groups, said control signal tending to be misphased whenever the amplitude of said writing signal is high, means for producing in response to the scanning within said tube a second control signal having a frequency different from that of said first control signal and not subject to misphasing by high writing signal amplitude but lacking in unambiguous phasal indication of the instantaneous position of said beam in relation to the elements of each of said groups, means for deriving from said second control signal an index signal having a frequency corresponding to the rate of scanning of said groups, and means for utilizing said first control signal to phase said index signal in correspondence to beam position.

14. In a color television receiver including a color image-producing cathode ray tube having successive groups of screen elements which are successively impinged by an electron beam during each line scan and which emit light of different primary colors, and wherein a color writing signal is supplied to said tube phased according to indexing information of an index signal, apparatus for producing the index signal comprising means for producing in response to scanning within said tube a first control signal having a frequency so related to the rate of scanning of said groups as to be unambiguously indicative of the instantaneous position of said beam in relation to the elements of each of said groups, said control signal tending to be misphased whenever the amplitude of said writing signal is high, means for producing in response to the scanning within said tube a second control signal having a frequency different from that of said first control signal and not subject to misphasing by high writing signal amplitude but lacking in unambiguous phasal indication of the instantaneous position of said beam in relation to the elements of each of said said groups, means for converting said second control signal to an index signal having a frequency corresponding to the rate of scanning of said groups, means for normally supplying said first control signal to said converting means throughout each line scan to phase said index signal in correspondence to beam position, and means for interrupting the supply of said first control signal to said converting means whenever in the course of a line scan the phase of said first control signal may be adversely affected by high writing signal amplitude.

15. In a color television receiver including a color image-producing cathode ray tube having successive groups of screen elements which are successively impinged by an electron beam during each line scan and which emit light of different primary colors, and wherein a color writing signal is supplied to said tube phased according to indexing information of an index signal, apparatus for producing the index signal comprising means for producing in response to scanning within said tube a first control signal having a frequency so related to the rate of scanning of said groups as to be unambiguously indicative of the instantaneous position of said beam in relation to the elements of each of said groups, said control signal tending to be misphased whenever the amplitude of said writing signal is high, means for producing in response to the scanning within said tube a second control signal having a frequency different from that of said first control signal and not subject to mis-phasing by high writing signal amplitude but lacking in unambiguous phasal indication of the instantaneous position of said beam in relation to the elements of each of said groups, means for converting said second control signal to an index signal having a frequency corresponding to the rate of scanning of said groups, a normally-conductive gated amplifier, means for normally supplying said first control signal through said amplifier to said converting means throughout each line scan to phase said index signal in correspondence to beam position, and means for rendering said amplifier non-conductive whenever in the course of a line scan the phase of said first control signal may be adversely affected by high writing signal amplitude.

16. A color television receiver according to claim 15, wherein the means for rendering said amplifier non-conductive comprises a gate generator responsive to high amplitude of said writing signal.

17. In a color television receiver, a color image-producing cathode ray tube having an image screen to be scanned line-by-line by an electron beam within the tube, means for effecting the scanning motion of the electron beam, said screen comprising successive groups of colored light-emissive elements which are successively impinged by the electron beam during each line scan, the elements of each group successively emitting light of different primary colors, means for varying the intensity of said beam in accordance with video components of a color television signal including a chrominance component successively and repetitively representative of said primary colors, means for producing in response to the scanning of said screen a first control signal having a frequency so related to the rate of scanning of said groups as to be unambiguously indicative of the instantaneous position of said beam in relation to the elements of each of said groups, said control signal tending to be misphased whenever the chrominance modulation of said beam is high, means for producing in response to the scanning of said screen a second control signal having a frequency different from that of said first control signal and not subject to misphasing by high beam modulation but lacking in unambiguous phasal indication of the instantaneous position of said beam in relation to the elements of each of said groups, means for converting said second control signal to a third control signal having a frequency corresponding to the rate of scanning of said groups, means for supplying said first control signal to said converting means at the beginning of each line scan to phase said third control signal in correspondence to beam position, means for interrupting the supply of said first control signal to said converting means during the remainder of each line scan, and means for utilizing said third control signal to effect proper time coordination between chrominance modulation and position of said beam.

18. In a color television receiver, a color image-producing cathode ray tube having an image screen to be scanned line-by-line by an electron beam within the tube, means for effecting the scanning motion of the electron beam, said screen comprising successive groups of colored light-emissive elements which are successively impinged by the electron beam during each line scan, the elements of each group successively emitting light of different primary colors, means for varying the intensity of said beam in accordance with video components of a color television signal including a chrominance component successively and repetitively representative of said primary colors, means for producing in response to the scanning of said screen a first control signal having a frequency so related to the rate of scanning of said groups as to be unambiguously indicative of the instantaneous position of said beam in relation to the elements of each of said groups, said control signal tending to be misphased whenever the chrominance modulation of said beam is high, means for producing in response to the scanning of said screen a second control signal having a frequency different from that of said first control signal and not subject to misphasing by high beam modulation but lacking in unambiguous phasal indication of the instantaneous position of said beam in relation to the elements of each of said groups, means for converting said second control signal to a third control signal having a frequency corresponding to the rate of scanning of said groups, a normally-conductive gated amplifier, means for supplying said first control signal through said amplifier to said converting means at the beginning of each line scan to phase said third control signal in correspondence to beam position, means for supplying a gating signal from said converting means to said amplifier during the remainder of each line scan to render said amplifier non-conductive, and means for utilizing said third control signal to effect proper time coordination between chrominance modulation and position of said beam.

19. In a color television receiver wherein a color image is produced by translation of video signal components including a chrominance component successively and repetitively representative of primary colors of the image, a color image-producing cathode ray tube having an image screen to be scanned line-by-line by an electron beam within the tube, means for effecting the scanning motion of the electron beam, said screen comprising successive groups of colored light-emissive elements which are successively impinged by the electron beam during each line scan, the elements of each group successively emitting light of said primary colors, means for varying the intensity of said beam in accordance with said video components, means for producing in response to the scanning of said screen a first control signal having a frequency so related to the rate of scanning of said groups as to be unambiguously indicative of the instantaneous position of said beam in relation to the elements of each of said groups, said control signal tending to be misphased whenever the chrominance modulation of said beam is high, means for producing in response to the scanning of said screen a second control signal having a frequency which bears a fractional relation to the rate of scanning of said groups, said second control signal not being subject to misphasing by high beam modulation but lacking the unambiguity of said first control signal, means comprising a frequency conversion loop for converting the frequency of said second control signal to produce a third control signal having a frequency corresponding to the rate of scanning of said groups, means for utilizing said first control signal to start said conversion loop in correct phase at the beginning of each line scan, and means for utilizing said third control signal to effect proper time coordination between chrominance modulation and position of said beam.

References Cited in the file of this patent

UNITED STATES PATENTS

| | | |
|---|---|---|
| 2,743,312 | Bingley | Apr. 24, 1956 |
| 2,771,503 | Schwartz | Nov. 20, 1956 |
| 2,945,087 | Graham et al. | July 12, 1960 |